(12) United States Patent
Ogawa et al.

(10) Patent No.: US 7,894,941 B2
(45) Date of Patent: Feb. 22, 2011

(54) SOUND DETECTION AND ASSOCIATED INDICATORS FOR AN AUTONOMOUS MOVING ROBOT

(75) Inventors: Naohide Ogawa, Saitama (JP); Takuro Koyanagi, Saitama (JP); Asuka Shinna, Saitama (JP); Sachie Hashimoto, Saitama (JP); Yukiko Ehara, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 867 days.

(21) Appl. No.: 11/294,366

(22) Filed: Dec. 6, 2005

(65) Prior Publication Data

US 2006/0129275 A1 Jun. 15, 2006

(30) Foreign Application Priority Data

Dec. 14, 2004 (JP) ............................. 2004-361530

(51) Int. Cl.
*G08B 5/36* (2006.01)
(52) U.S. Cl. .................... 700/258; 700/245; 340/815.46
(58) Field of Classification Search ................. 700/258, 700/245, 247, 257; 340/815.46, 691.6; 116/202; 381/60
See application file for complete search history.

(56) References Cited

U.S. PATENT DOCUMENTS

| | | | |
|---|---|---|---|
| 3,911,618 A * | 10/1975 | Gerst | 446/329 |
| 7,348,746 B2 * | 3/2008 | Ogawa et al. | 318/568.12 |
| 2003/0055532 A1 * | 3/2003 | Sakagami et al. | 700/245 |
| 2003/0130851 A1 * | 7/2003 | Nakakita et al. | 704/275 |
| 2003/0133577 A1 | 7/2003 | Yoshida | |
| 2004/0015265 A1 | 1/2004 | Asano et al. | |
| 2004/0210345 A1 * | 10/2004 | Noda et al. | 700/245 |

FOREIGN PATENT DOCUMENTS

JP 2002-116792 4/2002

(Continued)

OTHER PUBLICATIONS

WO 2004/071718, Ogawa et al, Abnormality Detector of Moving Robot, Aug. 26, 2004.*

(Continued)

*Primary Examiner*—Khoi Tran
*Assistant Examiner*—Spencer Patton
(74) *Attorney, Agent, or Firm*—Squire, Sanders & Dempsey (US) LLP (57) ABSTRACT

The present invention aims to provide an autonomous moving robot capable of visibly showing the human an initial check result for a sound input means in the initial stage after the robot device is turned on and activated, and whether or not the input sound was normally recognized. The robot has ears 9a, 9b respectively comprising microphones 10a, 10b for external sound input, and LED displays 11a, 11b with a plurality of luminescent portions around the respective microphones. The luminescent portions of the LED displays 11a, 11b indicate the judgment of the initial check on whether or not the ears 9a, 9b (the microphones 10a, 10b and the LED displays 11a, 11b) are normally functioning when the robot is turned on and activated, by means of the lighting states of the displays.

5 Claims, 5 Drawing Sheets

FOREIGN PATENT DOCUMENTS

| | | |
|---|---|---|
| JP | 2002-120181 | 4/2002 |
| JP | 2003-172773 | 6/2003 |
| JP | 2003-266348 | 9/2003 |
| JP | 2003-266351 | 9/2003 |
| JP | 2003-285285 | 10/2003 |
| JP | 2003-326479 | 11/2003 |

OTHER PUBLICATIONS

Chip Technologies for Entertainment Robots, 2002, Sony, http://www.sony.net/Products/SC-HP/cx_news/vol32/sideview.html.*

QRIO, 2003, Sony, http://www.aibo-kennel.com/QR10/QRIO_Brochure.pdf.*

* cited by examiner

SOUND DETECTION AND ASSOCIATED INDICATORS FOR AN AUTONOMOUS MOVING ROBOT

BACKGROUND OF THE INVENTION

1. Field of the Invention

The present invention relates to an autonomous moving robot, and in particular to an autonomous moving robot having a body to which is coupled a head with ears.

2. Description of the Related Art

In recent years, autonomous moving robots have been proposed which are designed to communicate with a human by expressing an emotion by means of, for example, flashing in a predetermined flashing pattern a plurality of LEDs located at positions functioning as pseudo eyes in response to, for example, a human body motion, and further to make a predetermined motion in response to a speech to the robot by the human. One such example is disclosed in Japanese Patent Application Laid-Open (Kokai) No. 2002-120181 (FIGS. 1 and 3).

A robot device (pet robot) as disclosed in the above-mentioned patent document uses a microphone that functions as an "ear" for inputting a human voice, to make preset movements based on the input voice information. However, the robot device had a demerit that in the initial phase of turning on the robot from an off state, the human could not judge whether or not the sound input means including the microphone functioning as the "ear" of the robot device was functioning in a normal manner, until the human talks to the device which in response makes a predetermined movement.

Therefore, an object of the present invention is to provide an autonomous moving robot that allows the human to easily check the initial status of the sound input means in the initial stage when the robot device is turned on and activated.

SUMMARY OF THE INVENTION

In order to achieve the abovementioned object, according to one aspect of the present invention, there is provided an autonomous moving robot comprising a sound input means functioning as a pseudo ear on both sides of a drivable head attached to a body, the robot being capable of autonomously moving by driving legs attached to the lower portion of the body, wherein the sound input means comprises: a sound input portion for external sound input; and a display means positioned in the vicinity of the sound input portion and having a plurality of luminescent portions integrally coupled to each other, and wherein the robot further comprises a control means that judges the initial status check on whether or not each of the sound input means is normally functioning when the robot is turned on and activated, and indicates the judgment by means of a lighting state of the luminescent portions.

The above-mentioned aspect of the present invention can indicate the judgment of the initial check on whether or not each of the sound input means is normally functioning when the robot is turned on and activated, by means of the lighting states of the luminescent portions.

According to one aspect of the present invention, the control means individually controls, after the initial status check, the on/off state of the luminescent portions in a corresponding manner with the magnitude of the sound that is input to the sound input portion, whether or not the sound is recognized, and the direction of the sound.

The above-mentioned aspect of the present invention can individually control and turn on/off, right after the judgment of the initial status check, the luminescent portions depending on the magnitude of the sound that is input to the sound input means, whether or not the sound is recognized, and the direction of the sound.

According to one aspect of the present invention, the control means drives and controls at least the head in a corresponding manner with the magnitude of the sound that is input to the sound input portion, whether or not the sound is recognized, and the direction of the sound, when individually controlling the on/off state of the luminescent portions in a corresponding manner with the magnitude of the sound that is input to the sound input portion, whether or not the sound is recognized, and the direction of the sound.

The above-mentioned aspect of the present invention can drive and control at least the head, when individually controlling the on/off state of the luminescent portions in a corresponding manner with the magnitude of the sound that is input to the sound input portion, whether or not the sound is recognized, and the direction of the sound.

DESCRIPTION OF THE PREFERRED EMBODIMENT

The present invention will now be described on the basis of an embodiment shown in the drawings.

Figure 1:
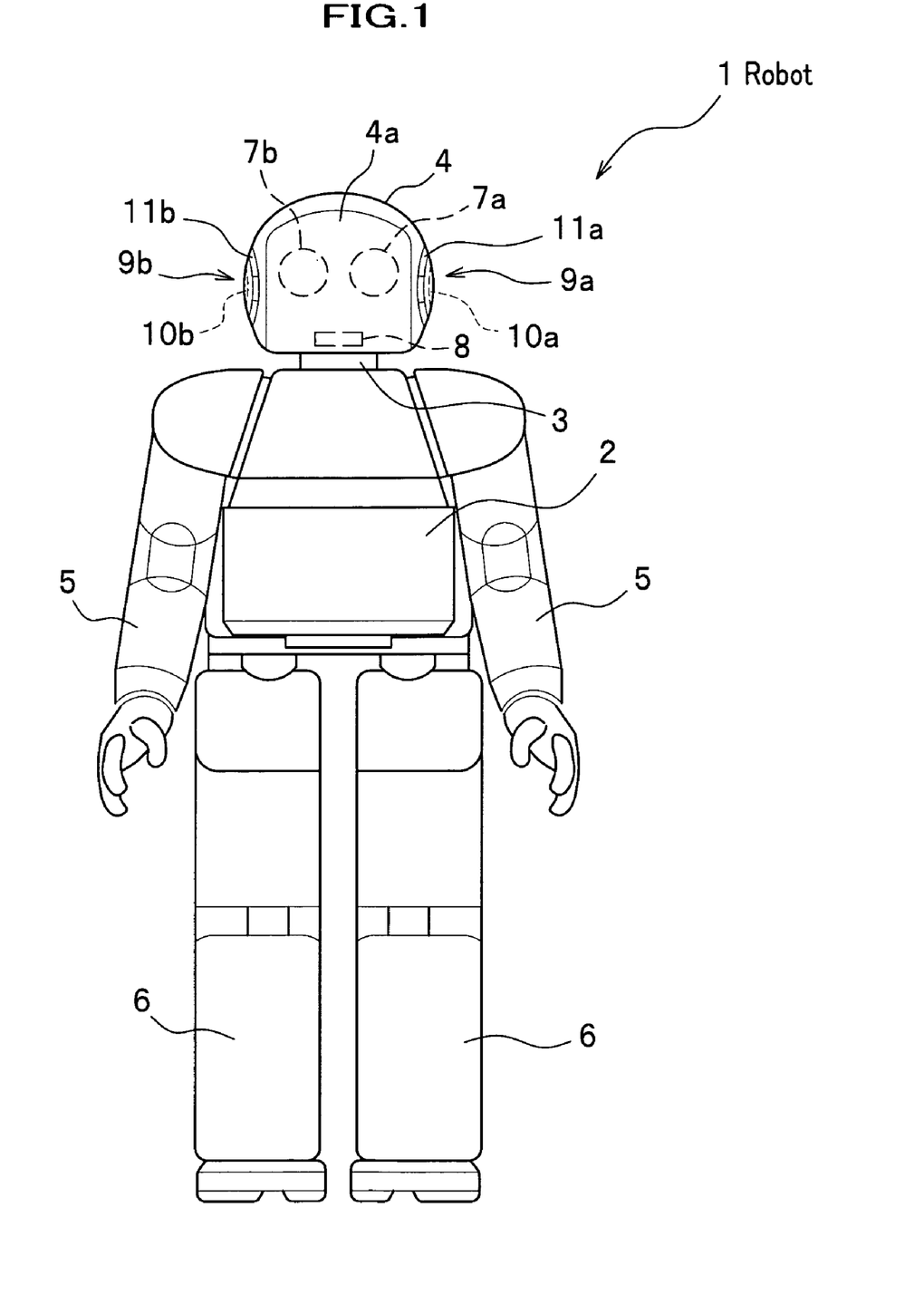
FIG. 1 is a front view showing a robot according to an embodiment of the invention.
Figure 2:
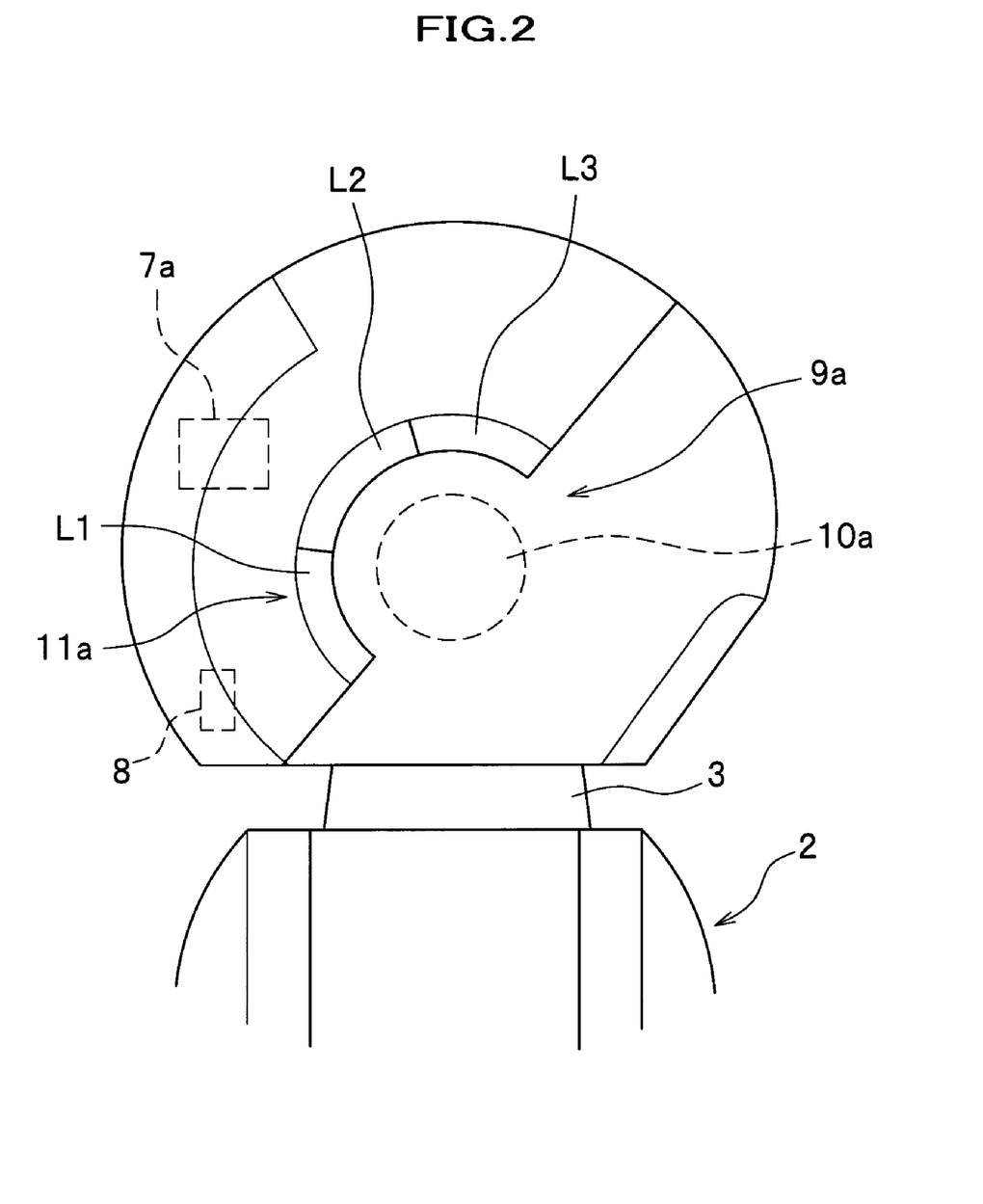
FIG. 2 is a side view showing a head of a robot according to an embodiment of the invention.
Figure 3:
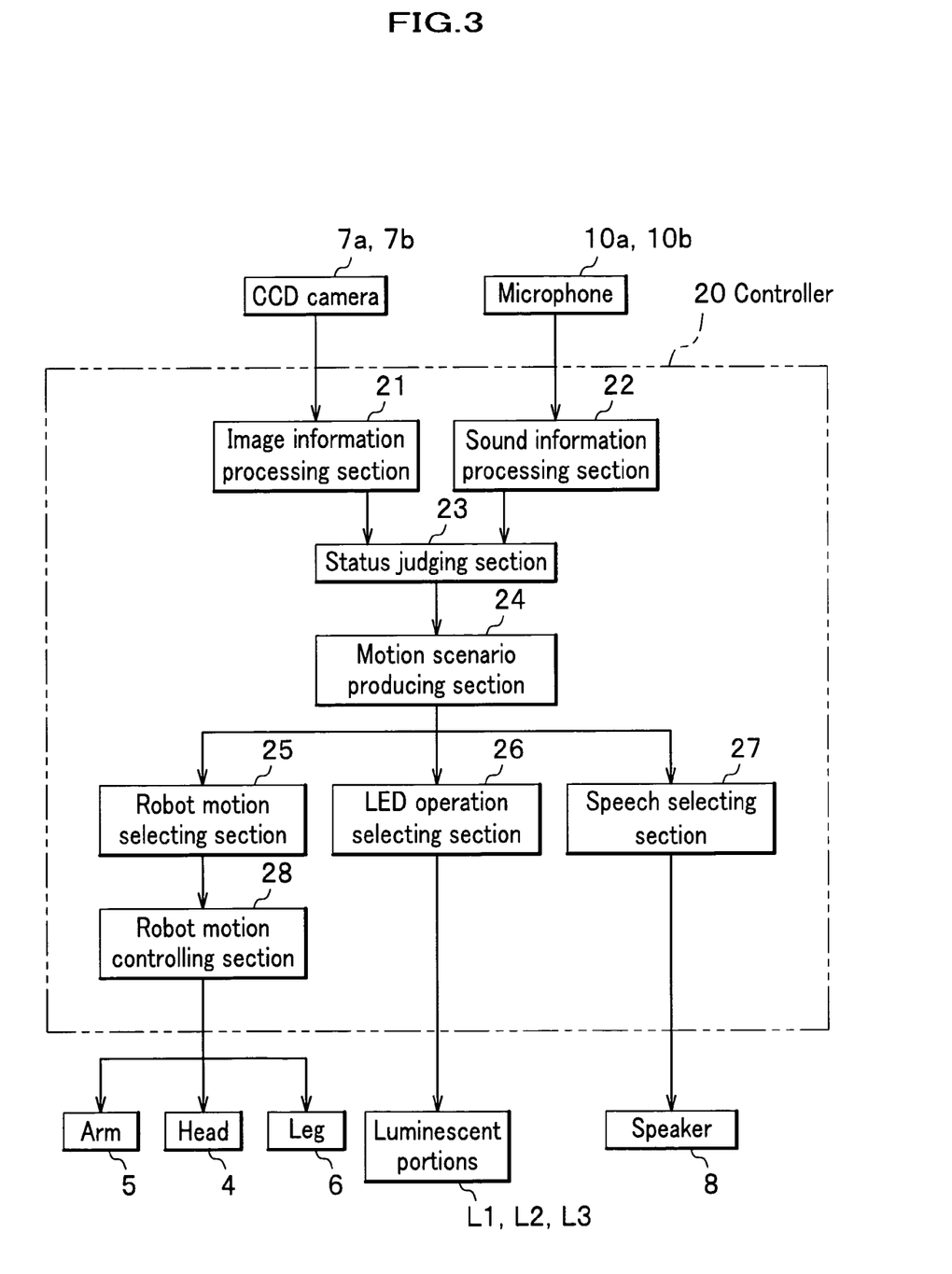
FIG. 3 is a block diagram showing a configuration of a controller of a robot according to an embodiment of the invention.

FIG. 1 is a front view showing an autonomous moving dual-legged robot as a robot according to an embodiment of the invention (hereinafter referred to as "robot"). FIG. 2 is a side view showing a head of a robot according to an embodiment of the invention. FIG. 3 is a block diagram showing a configuration of a controller of a robot according to an embodiment of the invention.

<Robot Structure>

As shown in FIGS. 1 and 2, a robot 1 according to the present embodiment comprises a body 2 having on its top a head 4 coupled via a neck 3, two arms 5 each on both sides of the upper portion of the body 2, and two legs 6 on the lower portion of the body 2.

The head 4 (neck 3), the arms 5, and the legs 6 each has a joint corresponding to that of the human movable by an actuator (not shown), and are controlled in motion by a robot motion controlling section 28 (FIG. 3).

The head 4 has on its front portion (face) 4a two CCD cameras 7a, 7b laterally arranged at a predetermined interval, a speaker 8 placed below the cameras 7a, 7b, and ears 9a, 9b each provided as a sound input means on both sides of the head 4. The front portion 4a is formed of a visible light transmittable material.

The two CCD cameras 7a, 7b capture an image in the forward moving direction of the robot 1, and information on the image is input to an image information processing section 21 (FIG. 3). The speaker 8 can make a predetermined sound based on predetermined speech information pre-stored in a speech selection section 27 (FIG. 3).

The ears 9a, 9b respectively comprise microphones 10a, 10b as sound input portions, and LED displays 11a, 11b therearound as display means in a half circular arc shape. The sound information detected by the microphones 10a, 10b is input to a sound information processing section 22 (FIG. 3). As shown in FIG. 2, the LED display 11a comprises three luminescent portions L1, L2, L3 divided but integrally structured. On activation of the robot 1, the luminescent portions L1, L2, L3 can individually light on (flash) and off depending on the sound recognition status of the microphone 10a and the direction of the sound source or the human (discussed later in detail). The ear 9b on the other side (the right side of the head 4) is also structured in the same manner. The luminescent portions L1, L2, L3 each has a plurality of LEDs (e.g., white LEDs) installed therein. When all of the luminescent portions L1, L2, L3 lit on, the LED displays 11a, 11b light on in a half circular arc shape.

<Robot Controller>

FIG. 3 is a block diagram showing a configuration of a controller of the robot. As shown in the drawing, the controller 20 includes an image information processing section 21, a sound information processing section 22, a status judging section 23, a motion scenario producing section 24, a robot motion selecting section 25, an LED operation selecting section 26, a speech selecting section 27, and a robot motion controlling section 28.

The image information processing section 21 processes an image on the basis of image information input from the CCD cameras 7a, 7b, to recognize the shape of an object (e.g., an obstacle and the human) existing in the viewing range, and to compute (recognize) the distance from and the position of the object. The viewing range is, for example, approximately 150 degrees in horizontal and vertical directions within, for example, 2 to 3 meters from the front of the robot 1, with the robot 1 standing upright facing its forward moving direction.

On the basis of the sound information which is input from each of the microphones 10a, 10b, the sound information processing section 22 conducts operations for: recognizing whether or not a sound is being input from the sound source, which in this embodiment is the human (hereinafter referred to as "sound recognition"); specifying the direction of the sound source (hereinafter referred to as "sound source localization"); and obtaining the level of the sound input (hereinafter referred to as "Mic Level"). With the microphones 10a, 10b equipped in the both ears 9a, 9b, the sound information processing section 22 uses time deviation between the respective sound information input from the microphones, to allow localizing the sound source. A good audible range of the microphones 10a, 10b is, for example, from right beside the robot 1 to, for example, 2 to 3 meters around the front side thereof.

The status judging section 23 includes two operations: judging whether or not an object such as the human and an obstacle exists in the moving direction of the robot 1, based on the image information processed by the image information processing section 21; and further recognizing the sound, localizing the sound source, and determining the Mic level, based on the sound information processed by the sound information processing section 22.

The motion scenario producing section 24, based on the status judgment obtained in the status judging section 23, judges that a human exists nearby in front. When judging that there is also a sound input, the motion scenario producing section 24 judges that a human is talking to the robot 1, and selects a motion scenario corresponding to this situation from a plurality of motion scenarios prestored therein (described in detail later), and further, based on the selected motion scenario, controls the robot motion selecting section 25, the LED operation selecting section 26, and the speech selecting section 27.

The robot motion selecting section 25 then selects, based on the motion scenario selected in the motion scenario producing section 24, an appropriate robot motion such as leaning the head 4 (the neck 3) to the side, from a plurality of robot motions prestored therein.

The LED operation selecting section 26 selects either turning on (flashing) or off the LEDs of the luminescent portions L1, L2, L3, based on the motion scenario selected in the motion scenario producing section 24 and the processing information (for example, sound recognition, sound source localization, and Mic level) from the sound information processing section 22 (described in detail later).

The LED operation selecting section 26 has two functions to be performed when the LED displays 11a, 11b and microphones 10a, 10b have no failure right after the robot 1 is turned on and activated; checking the initial status by temporarily turning on all of the luminescent portions L1, L2, L3; and right after the initial check, discretely turning on the displays L1, L2, L3 with respect to the sound that is input to the microphones 10a, 10b, depending on the sound recognition, sound source localization, and Mic level (described in detail later). When the microphones 10a, 10b has a Mic level lower than a predetermined threshold value, the LED operation selecting section 26 turns off all of the luminescent portions L1, L2, L3.

The speech selecting section 27 selects an appropriate speech content from a plurality of prestored speech contents, on the basis of the motion scenario selected in the motion scenario producing section 24.

The robot motion controlling section 28 drives and controls the head 4 (neck 3), arms 5, and legs 6 on the basis of the robot motion selected in robot motion selecting section 25.

<Initial Check for Ears and Operation for Sound Recognition>

Figure 4:
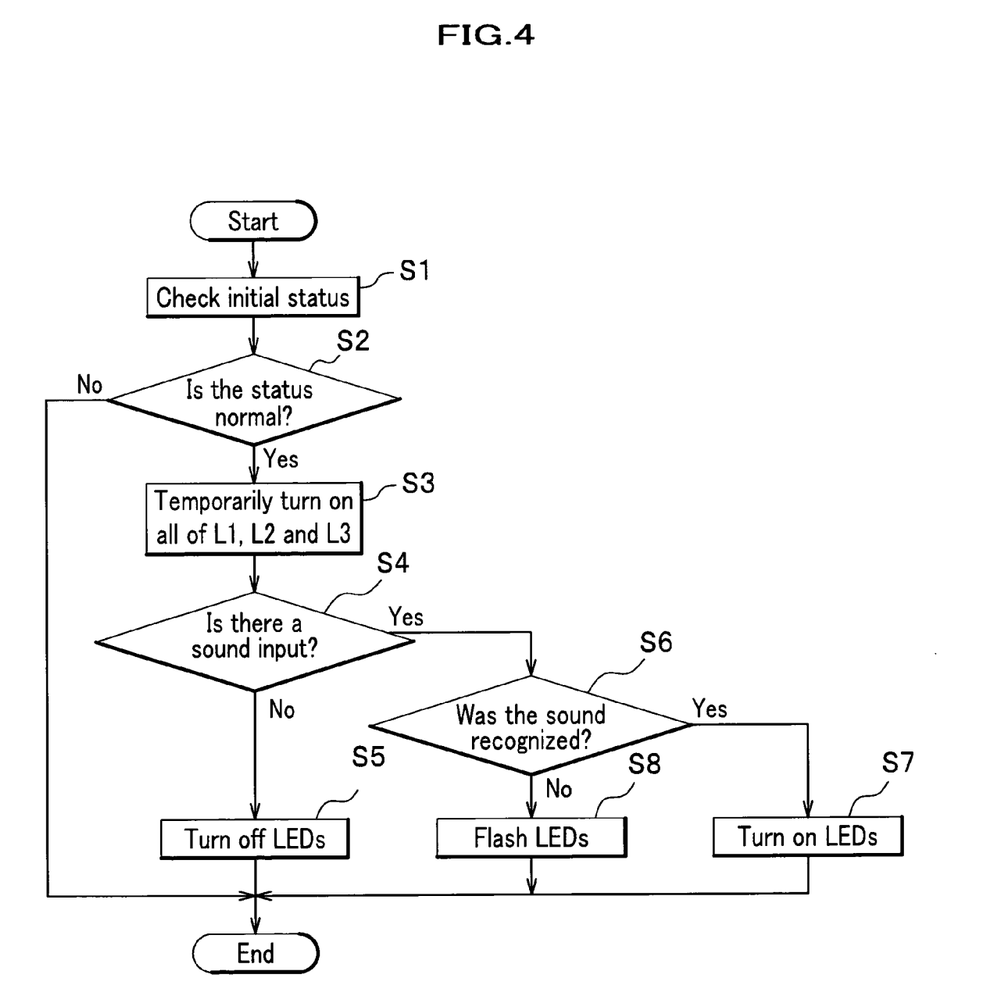
FIG. 4 is a flow chart showing an initial status check and a sound recognition operation of a robot according to an embodiment of the invention.

Referring now to the flow chart shown in FIG. 4, initial status check for the ears 9a, 9b and operation for sound recognition by the ears 9a, 9b on turning on and activating the robot 1 will be described.

When the power source (not shown) is turned on to activate the robot 1, the initial status check function for the LED operation selecting section 26 judges whether or not the LED displays 11a, 11b and the microphones 10a, 10b are normally operating (Steps 1 and 2). If YES in Step 2, that is the LED displays 11a, 11b and/or the microphones 10a, 10b has no failure, then the luminescent portions L1, L2, L3, now off, are controlled in a first manner or all temporarily turned on, for example (Step 3). This allows the human to visibly see that the LED displays 11a, 11b and the microphones 10a, 10b are functioning in a normal manner.

If NO in Step 2, that is the LED displays 11a, 11b and/or the microphones 10a, 10b has a failure, then the luminescent portions L1, L2, L3 in off state are controlled in a second manner or remained off, for example. This allows the human to visibly see that the LED displays 11a, 11b and/or the microphones 10a, 10b has a failure.

When YES in Step 2, it will immediately be possible to input sound to the microphones 10a, 10b after Step 3 (Step 4). If NO in Step 4, that is, none exists in the viewing range (oblique-lined area) A of the CCD cameras 7a, 7b such as shown in FIG. 5 and is talking to the robot 1, it is judged that the Mic level of the microphones 10a, 10b to be lower than a predetermined threshold value, and the luminescent portions L1, L2, L3 are controlled in a third manner or all turned off, for example (Step 5).

If YES in Step 4, i.e., a human M exists in the viewing range A of the CCD cameras 7a, 7b who is talking to the robot 1, the procedure proceeds to an operation of sound recognition (Step 6).

Figure 5:
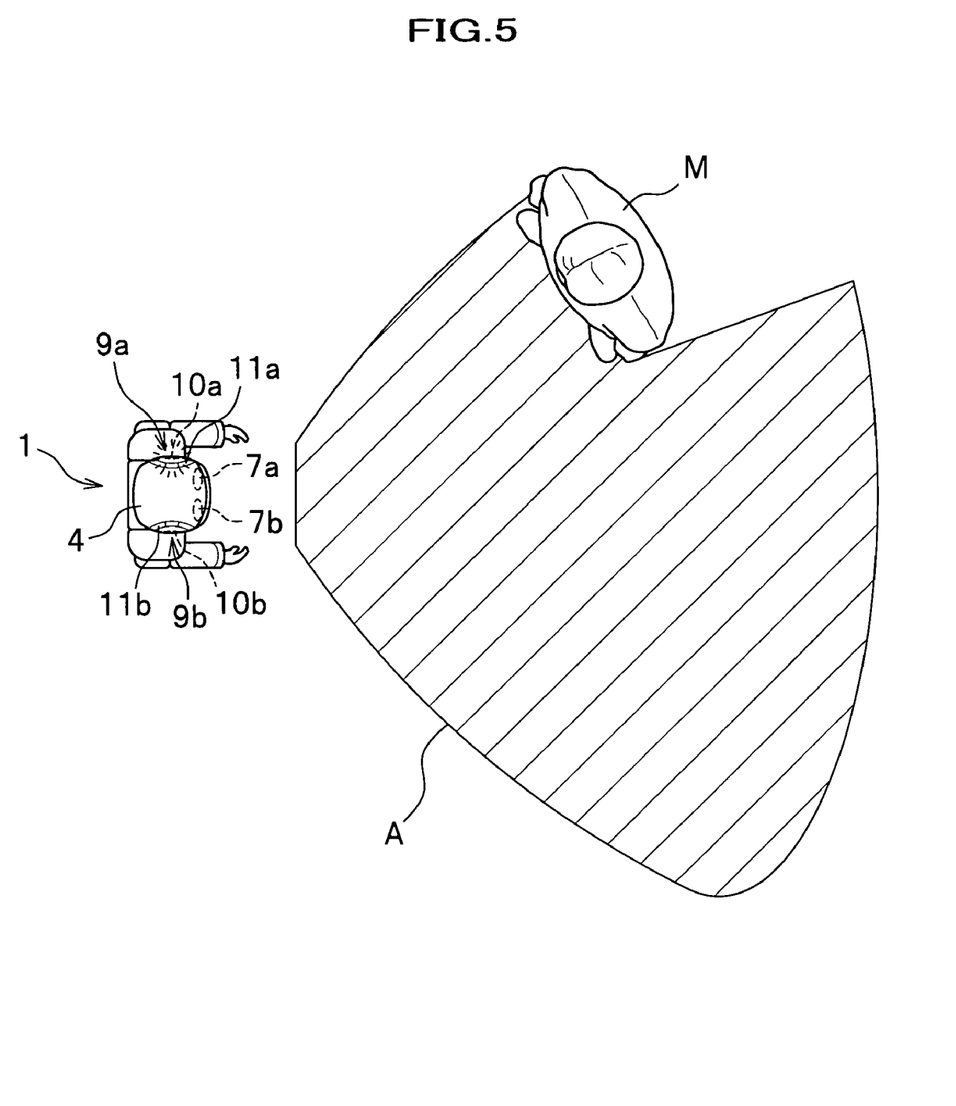
FIG. 5 is a plan view showing a robot according to an embodiment of the invention, with a human as an sound source standing in left oblique front thereof.

At this time, the status judging section 23 carries out two steps in the situation shown in FIG. 5: detecting the human M standing in left oblique front of the robot 1 based on the processing information from the image information processing section 21; and recognizing the sound, localizing the sound source, and detecting the Mic level based on the sound information processed by the sound information processing section 22. Then, based on the status judgment made by the status judging section 23, the motion scenario producing section 24 creates a motion scenario for this time (a situation in which the human M is talking to the robot 1 from left oblique front thereof, as shown in FIG. 5, for example).

Further, if the sound coming from the sound source (human M in FIG. 5) is successfully recognized (Yes in Step 6), then, depending on the sound recognition, the motion scenario producing section 24 causes the LED operation selecting section 26 to turn on the luminescent portions L1, L2, L3 in the following manner, for example (Step 7).

That is, in Step 7, if, for example, a human M is talking to the robot 1 from left oblique front of thereof as shown in FIG. 5, the luminescent portions L1, L2, L3 are controlled in a fourth manner or individually turned on, for example, by the motion scenario producing section 24, depending on the Mic level, in order to notify the human M in a visible manner that the robot 1 is aware the human is at the left oblique front thereof.

For example, when judging the sound level (Mic level) from the human M to the left microphone 10a to be low, the motion scenario producing section 24 turns on only the display L1; if normal (appropriate), two of the displays L1 and L2; and if high, all of the luminescent portions L1, L2 and L3.

In Step 7, when lighting up only the luminescent portion L1 because the Mic level is low, the motion scenario producing section 24 causes the robot motion selecting section 25 to select a motion such as obliquely leaning the head 4 (neck 3) to the side, so that the robot motion controlling section 28 controls and drives the head 4 (neck 3) to obliquely lean to the side. At the same time, the motion scenario producing section 24 selects and then causes the speaker 8 to output a speech such as "Please, speak once more, loudly." out of a plurality of speeches prestored in the speech selection section 27.

Also, in Step 7, when lighting up all of the luminescent portions L1, L2, L3 since the Mic level is high, the motion scenario producing section 24 causes the robot motion selecting section 25 to select a motion such as making a backward step with one of the legs 6, so that the robot motion controlling section 28 controls and drives the leg 6 accordingly. At the same time, the motion scenario producing section 24 selects and makes the speaker 8 output a speech such as "Please speak less loudly." out of a plurality of speeches prestored in the speech selection section 27.

Further in Step 7, when lighting up two of the luminescent portions L1 and L2 since the Mic level is appropriate, the motion scenario producing section 24 causes the robot motion selecting section 25 to keep the current posture, without selecting and making the speakers 8 output a speech from the speech selection section 27.

Again in Step 6, if the sound recognition is unsuccessful, the luminescent portions L1, L2 and L3 are controlled in a fifth manner or flashed, for example (No in Step 6). Then, the motion scenario producing section 24 makes the robot motion selecting section 25 to select a motion such as obliquely leaning the head 4 (neck 3) to the side, so that the robot motion controlling section 28 controls and drives the head 4 (neck 3) accordingly. At the same time, the motion scenario producing section 24 selects and causes the speaker 8 to output a speech such as "Please, speak once more." out of a plurality of speeches prestored in the speech selection section 27.

When the sound source or the human M is localized in 45 degrees or more of leftward angular direction with respect to the frontward direction of the robot 1, as in the aforementioned situation in FIG. 5, the luminescent portions L1, L2, L3 of the left ear 9a individually lights up depending on the Mic level. When the human M exists within an area of about 45 degrees in both sides with respect to the frontward direction of the robot 1, the luminescent portions L1, L2, L3 of both right and left ears individually light up depending on the Mic level. When the human M exists in 45 degrees or more of rightward angular direction with respect to the frontward direction of the robot 1, the luminescent portions L1, L2, L3 of the right ear 9a individually light up depending on the Mic level. The robot motion controlling section 28 may also control and orient the head 4 (neck 3) toward the direction of the human M, where the sound source is localized.

Thus, the robot 1 according to the embodiment comprises the checking function for checking the initial status of the LED displays 11a, 11b and the microphones 10a, 10b. When the robot 1 is turned on and activated, the function permits visibly notifying the human that the LED displays 11a, 11b and the microphones 10a, 10b are normally functioning, by temporarily lighting up the luminescent portions L1, L2, L3 of the LED displays 11a, 11b.

The robot 1 can also visibly inform the human M of the Mic level of the sound source or the human voice, status of sound recognition, and localization of the sound source, by means of lighting up (flashing) and off the luminescent portions L1, L2, L3. At this time, with a combined use of the head 4 (neck 3), the robot 1 can better familiarize the communication with the human when having a voice input (recognizing a voice).

It should be appreciated that although the LED displays 11a, 11b are each formed by the triply divided luminescent portions L1, L2, L3 in the aforediscussed embodiment, the invention is not limited thereto but may employ, for example, a doubly or quadruply divided luminescent portions to form the displays.

As described heretofore, the present invention has the following features.

According to item 1 of the present invention, there is provided an autonomous moving robot comprising a sound input means functioning as a pseudo ear on both sides of a drivable head attached to a body, the robot being capable of autonomously moving by driving legs attached to the lower portion of the body, wherein the sound input means comprises: a sound input portion for external sound input; and a display means positioned in the vicinity of the sound input portion and having a plurality of luminescent portions integrally coupled to each other, and wherein the robot further comprises a control means that judges the initial status check on whether or not each of the sound input means is normally functioning when the robot is turned on and activated, and indicates the judgment by means of a lighting state of the luminescent portions.

The invention of item 1 can show the initial check on whether or not the sound input means are normally functioning when the robot is turned on and activated, by means of the lighting states of the luminescent portions, and thereby allows the human to easily and visibly recognize the judgment.

According to item 2 of the present invention, the control means individually controls, after the initial status check, the on/off state of the luminescent portions in a corresponding manner with the magnitude of the sound that is input to the sound input portion, whether or not the sound is recognized, and the direction of the sound.

The invention of item 2 permits the human to visibly see the state with which the robot is recognizing the input sound, because the robot can individually control and turn on/off, right after the judgment of the initial status check, the luminescent portions in a corresponding manner with the magnitude of the sound that is input to the sound input means, whether or not the sound is recognized, and the direction of the sound.

According to item 3 of the present invention, the control means drives and controls at least the head in a corresponding manner with the magnitude of the sound that is input to the sound input portion, whether or not the sound is recognized, and the direction of the sound, when individually controlling the on/off state of the luminescent portions in a corresponding manner with the magnitude of the sound that is input to the sound input portion, whether or not the sound is recognized, and the direction of the sound.

The inventions of items 3 enable the robot to have a familiar communication situation with the human when having a sound input, since the control means can drive and control at least the head, when individually controlling and turning on/off the luminescent portions depending on the magnitude of the sound that is input to the sound input portion, whether or not the sound is recognized, and the direction of the sound.

What is claimed is:

1. An autonomous moving robot comprising:
    a sound input unit functioning as a pseudo ear on both sides of a drivable head attached to a body, the robot being capable of autonomously moving by driving legs attached to the lower portion of the body,
    wherein the sound input unit comprises
        a sound input portion for external sound input; and
        a display unit partially surrounding the sound input portion and having a plurality of separate luminescent portions integrally coupled to each other, each of the plurality of luminescent portions comprising a plurality of LEDs; and
    wherein the robot further comprises a control unit that judges an initial status check on whether or not the sound input unit is normally functioning when the robot is turned on and activated, and indicates the judgment by a lighting state of the luminescent portions.

2. The autonomous moving robot as claimed in claim 1, wherein the control unit individually controls, after the initial status check, the on/off state of the luminescent portions in a corresponding manner with the magnitude of the sound that is input to the sound input portion, whether or not the sound is recognized, and the direction of the sound.

3. The autonomous moving robot as claimed in claim 2, wherein the control unit drives and controls at least the head in a corresponding manner with the magnitude of the sound that is input to the sound input portion, whether or not the sound is recognized, and the direction of the sound, when individually controlling the on/off state of the luminescent portions in a corresponding manner with the magnitude of the sound that is input to the sound input portion, whether or not the sound is recognized, and the direction of the sound.

4. The autonomous moving robot as claimed in claim 1, wherein the control unit drives and controls at least the head in a corresponding manner with the magnitude of the sound that is input to the sound input portion, whether or not the sound is recognized, and the direction of the sound, when individually controlling the on/off state of the luminescent portions in a corresponding manner with the magnitude of the sound that is input to the sound input portion, whether or not the sound is recognized, and the direction of the sound.

5. A method for an autonomous moving robot for an initial status check on whether or not each sound input unit is normally functioning when the robot is turned on and activated, the method comprising:
    configuring the sound input unit to function as a pseudo ear;
    judging whether or not a display unit and a sound input portion are normally operating on activation of the robot, wherein the display unit partially surrounds the sound input portion and has a plurality of separate luminescent portions integrally coupled to each other, each of the plurality of luminescent portions comprising a plurality of LEDs;
    controlling an on/off state of the luminescent portions in a first manner if the display unit and the sound input portion are normally operating, or controlling the on/off state of the luminescent portions in a second manner if the display unit and the sound input portion are not normally operating;
    allowing for sound input to the sound input portion after the step of controlling the on/off state of the luminescent portions in a first manner;
    judging the sound input portion has a sound level lower than a predetermined threshold value and controlling the on/off state of the luminescent portions in a third manner if the sound input portion receives no sound input, or recognizing the sound if the sound input portion receives any sound; and
    controlling the on/off state of the luminescent portions in a fourth manner if the sound recognition is successful, or controlling the on/off state of the luminescent portions in a fifth manner if the sound recognition is not successful.

* * * * *

UNITED STATES PATENT AND TRADEMARK OFFICE
CERTIFICATE OF CORRECTION

PATENT NO. : 7,894,941 B2
APPLICATION NO. : 11/294366
DATED : February 22, 2011
INVENTOR(S) : Naohide Ogawa et al.

It is certified that error appears in the above-identified patent and that said Letters Patent is hereby corrected as shown below:

On the Front Page of the Patent

--(75) Inventors, Third inventor should read

Asuka SHIINA

Signed and Sealed this
Twenty-first Day of June, 2011

David J. Kappos
*Director of the United States Patent and Trademark Office*